United States Patent [19]

Kasai

[11] Patent Number: 4,891,657

[45] Date of Patent: Jan. 2, 1990

[54] APPARATUS FOR FORMING AN IMAGE

[75] Inventor: Toshihiro Kasai, Yokohama, Japan

[73] Assignee: Kabushiki Kaisha Toshiba, Kawasaki, Japan

[21] Appl. No.: 333,312

[22] Filed: Apr. 5, 1989

[30] Foreign Application Priority Data

Apr. 6, 1988 [JP] Japan .................................. 63-84766

[51] Int. Cl.[4] .............................................. G01D 15/00

[52] U.S. Cl. ................................ 346/160.1; 346/153.1

[58] Field of Search .................. 346/160.1, 153.1, 150, 346/160, 74.2, 74.4; 355/210, 219, 251, 271, 274, 273

[56] References Cited

U.S. PATENT DOCUMENTS 4,649,402 3/1987 Lunde et al. ..................... 346/153.1

4,768,046 8/1988 Minor et al. ..................... 346/160.1

FOREIGN PATENT DOCUMENTS 37-16098 10/1962 Japan ................................ 346/160.1

*Primary Examiner*—Arthur G. Evans

*Attorney, Agent, or Firm*—Foley & Lardner, Schwartz, Jeffery, Schwaab, Mack, Blumenthal & Evans

[57] ABSTRACT

The particles of a first magnetic developing agent are electrostatically attracted to the electrostatic latent image formed on a photosensitive belt, thus forming a first developer image. An AC voltage having a frequency f [Hz] is applied to a magnetic head. The head magnetizes the first developer image, thereby forming a master image. The frequency f satisfies the following inequality:

$$\frac{V}{Dt \times 10^{-1}} \leq f \leq \frac{V}{Dt \times 10^{-5}}$$

where V [mm/sec] is the speed at which the developer image moves relative to the magnetic head, and Dt [μm] is the average particle size of a second magnetic developing agent. The particles of the second magnetic developing agent are attracted to the magnetized master image, thus forming a second developer image. The second developer image is transferred from the photosensitive belt onto a sheet of paper.

14 Claims, 5 Drawing Sheets

APPARATUS FOR FORMING AN IMAGE

BACKGROUND OF THE INVENTION

1. Field of the Invention

The present invention relates to an apparatus for forming an image, which is used as either a copying apparatus or a printer.

2. Description of the Related Art

Two types of apparatuses for copying an original are known. They are an electronic copier and a printing machine. Either type of a copying apparatus has advantages and disadvantages.

The printing machine is advantageous in that, although it requires a printing plate prepared from an original, the machine can make a great number of copies of the original at high speed by using the plate. The more copies are made, the less the printing cost. The electronic copier is advantageous since no complex preparation is required for copying the original, and thus is easy to operate.

The printing machine is disadvantageous in the following respect. The machine requires the plate to print copies, so that it takes more time to prepare for the copying of the original.

The electronic copier is disadvantageous, also in the following respect. The copying speed is much lower than the printing speed of the printing machine, since the sequence of processes, such as charging the photosensitive drum, scanning the original, developing the image, and discharging the drum, must be repeated to make each copy.

Various methods of copying an original have been proposed. Japanese Patent Publication No. 37-16098 disclosed a method wherein magnetic material is used to copy an original. In this method, the magnetic material is fixed on a photosensitive member, thus forming a fixed image, then other magnetic material is attracted onto the fixed image, and finally the other magnetic material is transferred onto a recording medium. There is a demand for an apparatus which employs such a copying method and can make, at high speed, a copy of an original which is clear and uniform in quality even if the original has fine lines and large black-out portions.

SUMMARY OF THE INVENTION

The object of the present invention is to provide an image-forming apparatus which is as easy as the conventional electronic copiers to operate, consumes a small amount of electric power, can make as many copies of one original, with a high speed, as the printing machine, and can form clear images identical to the original image.

According to the present invention, there is provided an image forming apparatus comprising: image-converting means for converting the image into an electrostatic latent image; first developing means for developing the electrostatic latent image on the image-converting means, with a first developing agent, thereby to form a first developer image; first fixing means for fixing the first developer image on the image-converting means, thereby to form a master image; means for magnetizing the master image; second developing means for developing the magnetized master image with a second developing agent, thereby to form a second developer image; storing means for storing a number of sheets; image-transferring means for electrostatically transferring one of the first and second developer images onto a sheet supplied from the storing means; and second fixing means for fixing the transferred image on the sheet.

Further, according to the invention, there is provided an image forming apparatus comprising: image-converting means for converting the image into an electrostatic latent image; first developing means for developing the electrostatic latent image on the image-converting means, with a first developing agent which is a magnetic, one-component developing agent, thereby to form a first developer image; first fixing means for fixing the first developer image on the image-converting means, thereby to form a master image; means for generating an AC voltage with frequency f [Hz]; magnetizing means for magnetizing the master image; second developing means for developing the magnetized master image with a second developing agent which is a magnetic, one-component developing agent having an average particle size Dt [μm] thereby to form a second developer image; image-transferring means for electrostatically transferring one of the first and second developer images onto a sheet; second fixing means for fixing the transferred image on the sheet; and drive means for moving the image-converting means at a first speed along the first developing means and the magnetizing means, and for moving the image-converting means at a second speed V [mm/sec] along the second developing means, wherein the speed V, the particle size Dt, andthe frequency f satisfy the following inequality:

$$\frac{V}{Dt \times 10^{-1}} \leq f \leq \frac{V}{Dt \times 10^{-5}}$$

DETAILED DESCRIPTION OF THE PREFERRED EMBODIMENTS

An embodiment of the present invention, which is an image forming apparatus, will now be described, with reference to the accompanying drawings.

Figure 1:
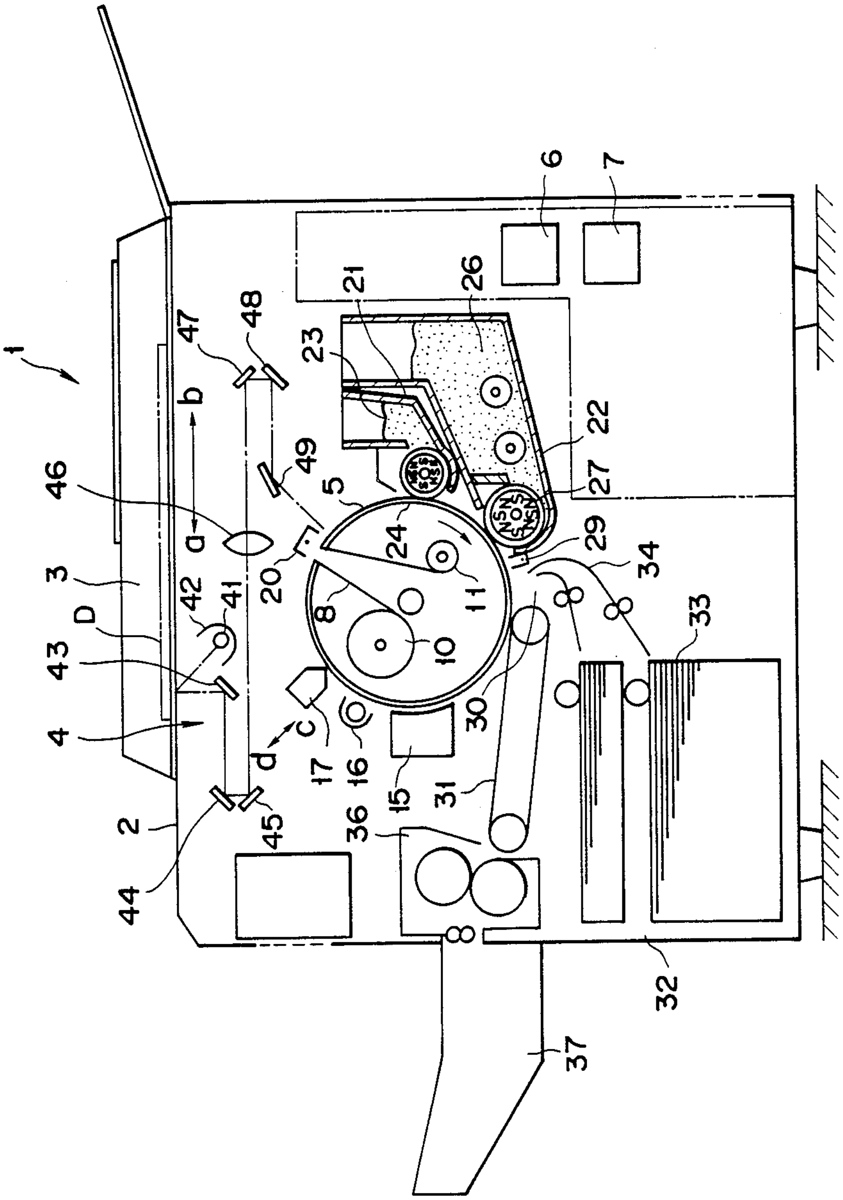
FIG. 1 is a cross-sectional view schematically showing an image forming apparatus according to this invention.

As is shown in FIG. 1, the image forming apparatus 1 comprises a rectangular housing 2, an original table 3 form-forms the top of the housing 2, an original cover (not shown) placed on the original table 3 and is able to be opened, and an optical system 4 located within the housing 2 and below the original table 3.

The optical system 2 is designed to apply light to the original D placed on the table 3 and guide the light reflected from the original D, to a drum 5 which is located within the housing 2 and below the optical system 2. The system 4 comprises a light source 41, a cover 42, mirrors 43, 44, and 45, a lens 46, and mirrors 47, 48, and 49. The cover 42 is located behind the light source 41 and thereby prevents the light from propagating rearward. The light emitted from the light source 41 is applied to the original D and reflected therefrom. The light is further reflected by the mirrors 43, 44, and 45, and is thereby guided to the lens 46. The lens 46 focuses the image. The mirrors 47, 48, and 49 reflects the focused image, and guide the light to the drum 5.

A drive mechanism is also provide within the housing 1. This mechanism moves the light source 41, and the mirror 43 together at a predetermined speed, back and forth in the directions of arrows a and b, whereby the original D is scanned in its entirety with the light emitted from the light source 41. As the light source 41 and the mirror 43 are thus moved, the mirrors 44 and 45 are also moved in the same direction at a half speed of the light source 41 and the mirror 43, so that the path of the light, which extends from the original D to the drum 5 remains unchanged regardless of the position of the light source 41.

The drum 5, which is provided within the housing 1, is rotated by a drive mechanism (not shown), in the direction of the arrow at either a first circumferential speed V1 or a second circumferential speed V2. For example, the speed V1 is 10 to 50 mm/sec, and the speed V2 is 500 mm/sec or more. The drive mechanism rotates the drum at the first speed V1 or the second speed V2 in accordance with the control signal supplied from a control section 6 located within housing 1.

Figure 3:
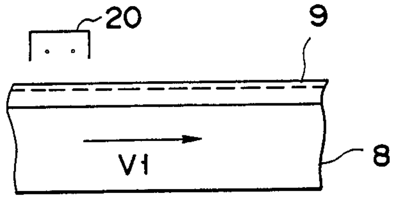
FIGS. 3 through FIG. 10 are diagrams explaining how the apparatus form an image when operated in the printing mode.
Figure 4:
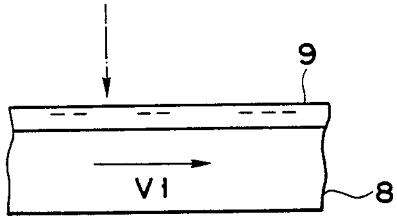

As can be understood from FIG. 1, a photosensitive belt 8 is wrapped once round the circumferential surface of the drum 5. As FIGS. 3 and 4 show, the belt 8 has a photosensitive layer 9 made of dielectric material and, thus, is able to form an electrostatic latent image on its surface. More precisely, the photosensitive layer 9 is made of zinc oxide and contains dye such as rose Bengal so that it is sensitive to light having a long wavelength in the visible region. The drum 5 has a transverse slit, and a belt feeding reel 10 and a belt take-up reel 11 are located within the drum 5. When the original D is replaced with a new one to be printed, a unused portion of the belt 8, which as long as the new original, is fed from a feeding reel 10, guides through the transverse slit, and wrapped around the drum 5, and the used portion of the belt 8 is guided through the slits and taken up around a take-up reel 11.

As is shown in FIG. 1, a corona charger 20, a first developing device 21, a second developing device a pretransfer corona charger 29, a sheet feeding section 30, an image-transfer belt 31, a fixing device 15, a discharging lamp 16, and a magnetic head 17 are arranged around the drum 5 in this order in the direction of the arrow. These components will be described one by one.

The corona charger 20 is positioned in a face-to-face relationship with the drum 5. It is designed to charge the photosensitive belt 8 negatively to −300 to −500 volts, as the drum 5 is rotated at the first circumferential speed V1.

The first developing device 21 contains a first magnetic developing agent 23, which is a so-called "conductive, magnetic, one-component developing agent." The first developing agent 23 is applied to the photo-sensitive belt 8 as a magnetic sleeve 27 is rotates.

The developing agent 23 is fine powder of magnetic material which has more high residual magnetism and greater coercive force than the magnetic material hitherto used. The powder has an average particle size ranging from 1 μm to 30 μm. Preferably, the developing agent 23 is fine powder of barium ferrite, $\mu$-$Fe_2O_3$, $Fe_3O_4$, Co-$\gamma$-$Fe_2O_3$, $CrO_2$, or Fe. The first magnetic developing agent 23 can be made of any material which can be readily permanently magnetized in the magnetic field the magnetic head 17 generates. Hence, powder of any highly magnetizable material other than those specified above can be used as the developing agent 23.

Alternatively, the first magnetic developing agent 23 can be a mixture of resin powder which can be flash-fixed and any magnetic powder described above, used in 30 to 70% by weight based on the resin powder. The average particle size of this mixed powder should also be 1 μm to 30 μm. The resin powder is made of ethylenevinyl acetate copolymer, ethylene-acrylic acid copolymer, low-molecular polypropylene, styrene, epoxy, polyester, polyamide, or the like.

The second developing device 22 contains a second magnetic developing agent 26. The agent 26 is supplied to the photosensitive belt 8 as a magnetic sleeve 27 rotates. The second developing agent 26 is a magnetic, one-component toner, i.e., fine powder of magnetic material such as $Fe_2O_4$, which has high resistivity and small residual magnetism. Alternatively, the second magnetic developing agent 26 can be a mixture of powder of styrene-acrylic acid copolymer and fine power of magnetic material such as $Fe_2O_4$, used from about 10% to 40% by weight based on the resin powder. The average particle size of this mixed powder is about 12 μm.

The pre-transfer corona charger 29 uniformly charges the second magnetic developing agent 26 attracted to the first magnetic developing agent 23 The corona charger 29 charges the agent 26 negatively so that the residual charged on the photosensitive layer 8 can be erased by applying light onto the layer 8.

The sheet feeding section 30 has a sheet guide 34 and supplies recording sheets 33, one by one, into the gap between the photosensitive layer 8 and the image-transfer belt 31, in synchronism with the image-transferring process performed by the image-transfer belt 31.

The image-transfer belt 31 is wrapped around a pair of rollers. This belt 31 consists of an endless belt and a dielectric layer formed on the endless belt and having a thickness of 20 μm to 40 μm. The dielectric layer is made of polyester or the like. A bias voltage of about 1000 V is applied to the image-transfer belt 31. The bias voltage has the polarity opposite to that of the corona applied by the pre-transfer corona charge 29. At the exit of the image-transfer belt 31, there are provided a fixing device 36 of the known heat-roller type, and a sheet-receiving tray 37 of the known type. Instead of applying the bias voltage to the belt 31, the sheet 33 can be charged by means of corona discharging.

The fixing device 15 has a xenon lamp for fixing the first developer image developed by the first developing device 21, thereby forming a magnetic pattern image 50 on the photosensitive belt 8. The discharging lamp 16 discharges the photosensitive layer 8 of the belt 8, thereby erasing the residual charge from the layer 9, which has an electric charge by means of either the corona charger 20 or the pre-transfer corona charger 29.

Figure 11:
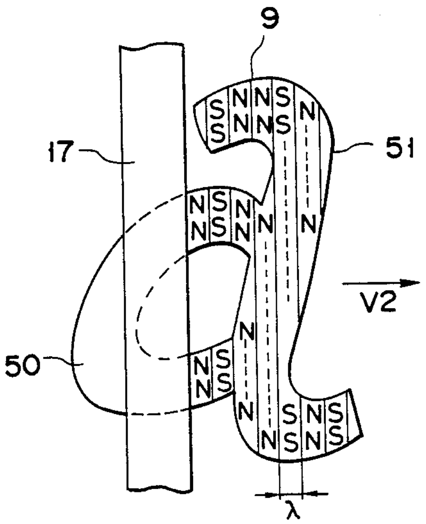
FIG. 11 is a diagram illustrating how the magnetic head magnetize the image developed with a magnetic developing agent.

The magnetic head 17 is, for example, a one-track head having a length approximately equal to the width of the photosensitive belt 8. The magnetic head 17 can be moved in the directions of arrows c and d as is illustrated in FIG. 1. It is moved toward the photosensitive belt 8, in the direction of arrow c, to form a magnetic latent image as will be described later. It is moved away from the belt 8, in the direction of arrow d, to print on the sheet 33. To form a magnetic latent image, an AC voltage of a predetermined frequency is applied from a power source 7 to the magnetic head 17 located close to the photosensitive belt 8, thus generating an AC magnetic field over the layer 8. The magnetic flux of the AC magnetic field extends alternately in the opposite directions. Therefore, as is shown in FIG. 11, the stripe-shaped portions of a magnetic pattern image 50, which have a width, are alternately magnetized in the opposite polarities S and N, thereby forming a magnetic latent image 51 on the photosensitive belt 8. To print the image on sheets 33 by using the magnetic latent image thus formed, the magnetic head 17 is moved away from the photosensitive belt 8. Once the head 17 has been set to remove from the belt 8, the magnetic latent image 51 is not adversely influenced by the magnetic head 17.

The frequency f of the AC voltage applied from the power source 7 to the magnetic head 17 is a prominent factor determining the width $\gamma$ of the stripe-shaped portions of the magnetic pattern image 50, and ultimately imposing a great influence on the quality of the image which will be formed on the sheet 33. When the frequency f is too low, the width $\gamma$ increases so much that the resultant image looks like a striped pattern. Further, since a thin vertical line is represented by only a few stripe-shaped portions of the magnetic latent image 51, the second magnetic developing agent 26 cannot be firmly attracted to the thin line of the magnetic latent image 51. Consequently, the magnetic latent image 51 fails to function as a magnetic latent image, and the image formed on the sheet 33 lacks the thin line.

Figure 2:
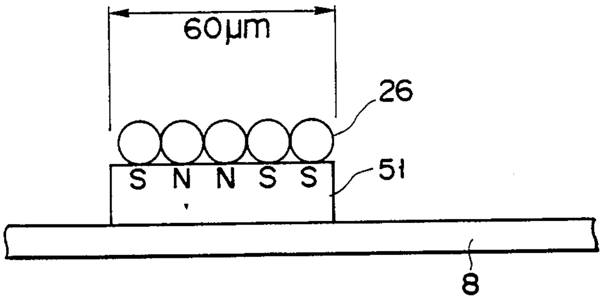
FIG. 2 is a diagram explaining the relationship between the frequency of the AC voltage applied to the magnetic head of the apparatus and the condition in which developer particles are magnetically attracted to the master image.

Generally, it is sufficient that an image has a resolution of 8 line-pairs per millimeter, i.e., 16 lines/mm. In other word, the thinnest line has a width of about 60 $\mu$m. Since the developing agent has an average particle size Dt of about 10 to 15 $\mu$m, from four to six particles of the developing agent must be arranged side by side, without gaps among them, in order to define the thinnest line, as is shown in FIG. 2. To arrange from four to six particles of the second magnetic developing agent in such a way, the stripe-shaped portions of the magnetic pattern image 50 must have a width $\gamma$ equal to the average particle size Dt of the second magnetic developing agent.

The optimum width $\gamma$ for the stripe-shaped portions of the magnetic pattern image 50 depends not only on the frequency f [Hz] and the particle size Dt [$\mu$m], but also on the circumferential speed of the drum 5, i.e., the relative speed V [mm/sec] between the magnetic head 17 and the magnetic pattern image 50. The inventors hereof prepared experiments wherein various values were applied for f, V, and Dt, to determine what relationship these parameters must have to form a magnetic pattern image having a sufficient resolution. They obtained the following relationship:

$$\frac{V}{Dt \times 10^{-1}} \leqq f \leqq \frac{V}{Dt \times 10^{-5}} \quad (1)$$

Whenever the frequency f, the relative speed V, and the particle size Dt satisfied the inequality (1), the magnetic pattern image had an adequate resolution, and the image reproduced from this magnetic pattern image was clear and complete, missing no parts or no thin lines. The relative speed V is equal to the first speed V1, i.e., 10 mm/sec. Thus, when the second magnetic developing agent has a particle size Dt of 10 $\mu$m, it is desired that the AC voltage applied to the magnetic head 17 has a frequency f of 10 Hz to $10\times 10^5$ Hz, in order to reproduce high-quality images.

With reference to FIG. 3 through FIG. 10, it will now be explained how the image forming apparatus 1 operates. The apparatus 1 can operates in two modes, i.e., the printing mode suitable for making a relatively large number of copies of an original, and the copying mode suitable for making a relatively small number of copies of an original.

First, it will be described how the apparatus operates in the printing mode. The apparatus 1 has an operation section (not shown). When the user operates this section, thus setting the apparatus 1 in the printing mode, the optical system 4 starts reading the image from the original D. At the same time, the drum 5 and, hence, the photosensitive belt 8 are rotated at the first speed V1 in the direction of the arrow shown in FIG. 1, under the control of the control signal supplied from the control section 6. As the belt 8 is thus rotated, it is negatively and uniformly charged by the corona charger 20, as is illustrated in FIG. 3. In the meantime, the magnetic head 17 is moved in the direction of arrow c (FIG. 1) it is located close to the photosensitive belt 8. The light, which has been emitted from the light source 41 and reflected from the original D, is applied onto the photosensitive belt 8, more precisely onto the photosensitive layer 9 of the belt 8. Those portions of the layer 9 which are exposed to the light are discharged, as is shown in FIG. 4. As a result, an electrostatic latent image identical to the original image is formed on the photosensitive layer 9.

Figure 5:
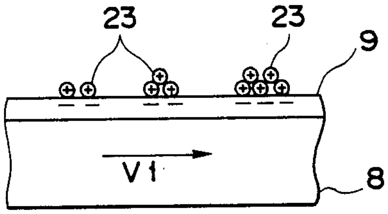

Then, the negatively charged latent image is developed with the first magnetic developing agent 23 by the first developing device 21, thus forming a first developer image on the photosensitive layer 9. More specifically, positive charges are induced on the sleeve 24 by the negatively charged electrostatic latent image and are injected into the first developing agent 23. Thus, as is shown in FIG. 5, the particles of the first magnetic developing agent 23, which have been positively charged, are electrostatically attracted to the negatively charged latent image of the photosensitive layer 9.

Figure 6:
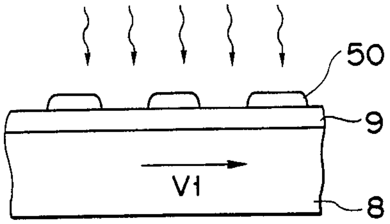

Next, as the drum 5 is further rotated, the photosensitive layer 9 is moved at the speed V1 to the fixing device 15. As is shown in FIG. 6, the xenon flash lamp of the device 15 applies heat to the layer 9. The first developing agent 23 is thereby melted and firmly adhere to the photosensitive layer 9, fixing the first developer image. The discharging lamp 16 erases residual charge from the layer 9 as this layer passes by it. The lamp 16 should better be kept on, in order to prevent the photosensitive layer 9 from being charged again after the process of erasing the residual charge.

Figure 7:
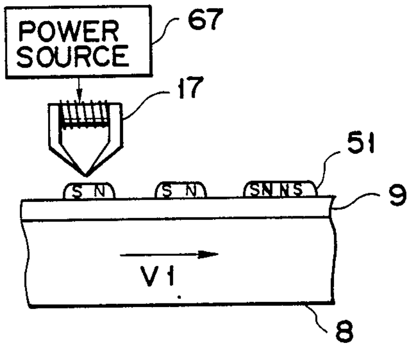

Thereafter, as the belt 8 is further rotated, the first developed image 50 passes in the AC magneticffield generated by the magnetic head 17 to which the AC voltage is applied from the power source 7. The AC voltage has a frequency f falling with the range specified by the formula (1). As it passes in the AC magnetic field, the first developed image 50 is permanently magnetized into a magnetic latent image 51, as is illustrated in FIG. 7. As is shown in FIG. 11, the magnetic latent image consists of stripe-shaped portions which have a width and are alternately magnetized in the opposite polarities S and N.

As can be understood from the above, when the drum 5 is rotated once for the first time after the apparatus 1 has been set in the printing mode, the master image (i.e., the magnetic latent image) is formed on the photosensitive belt 8. It should be noted that the belt 8 is not magnetized since it is non-magnetic. It is only the master image 5 which is magnetized by the magnetic head 17.

The drum 5 is continuously rotated, at a higher speed, that is, at the second speed V2. When the drum 5 starts rotating at the second speed V2, the magnetic head 17 is automatically moved in the direction of arrow d (FIG. 1), away from the drum 5. While the drum 5 is rotating at high speed, the second developing device 22 develops the magnetic latent image, and the developed image is transferred onto, or printed on, a sheet 33, as will be explained in detail.

Figure 8:
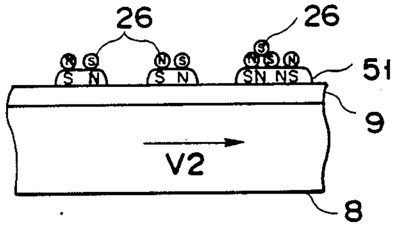

When the master image 51 moves to the second developing device 22, the particles of the second magnetic developing agent 26 are attracted to the master image 51 by a magnetic force, thereby forming a second developer image, as is shown in FIG. 8. The second developing agent 26 need not be electrically charged so as to be attracted to the master image 51. The magnetism of the magnetic sleeve 27 is adjusted, and is appropriately balanced with the magnetism of the master image 51. If the magnetism of the sleeve 27 is too strong, the agent 26 can not be applied to the master image 51 in an insufficient mount, inevitably reducing the developing efficiency, and eventually making it impossible to reproduce a clear image. Also, if the sleeve 27 generates a magnetic field stronger than the coercive force of the first magnetic developing agent 23, the master image 51, which is formed of the agent 23, may be erased in some cases. Conversely, if the magnetism of the sleeve 27 is insufficient, the second magnetic developing agent 26 cannot be effectively applied to the master image 51, rendering it difficult to reproduce a clear image.

Figure 9:
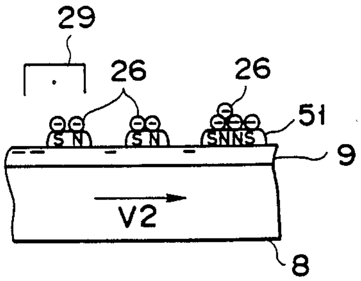

The second developer image, thus formed, is subjected to pre-transfer corona discharging by means of the pre-transfer corona discharger 29, and is thereby negatively charged as is illustrated in FIG. 9.

Each recording sheet 33 fed from the sheet feeding section 30 is conveyed by image-transfer belt 31, as the drum 5 rotates. Then, the sheet 33 is clamped between the photosensitive belt 8 and the image-transfer belt 31. As is shown FIG. 10, a bias voltage of the polarity opposite to that of the pre-transfer corona is applied to the image-transfer belt 31. Therefore, the second developer image is electro-statically transferred from the photosensitive layer 9 onto the recording sheet 33.

The sheet 33 is then transported to the fixing device 36 of the heat-roller type as the image-transfer belt 31 is driven. The fixing device 36 applies heat and pressure simultaneously to the sheet 33, whereby second developer image is fixed on the sheet 33.

The pre-transfer charging performed by the charger 29 can be omitted, provided that the second magnetic developing agent 26 is charged by friction and is actually charged sufficiently during the process of forming the second developer image. However, the pre-transfer charging should better be carried out to charge the second developer image when it is necessary to achieve electrostatic transfer of the image onto the sheet 33 within a short period of time.

Figure 10:
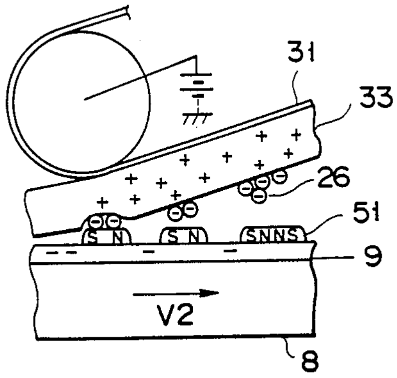

After the image has been printed on the first sheet 33 in the manner described above, the same image is then printed on the next sheet 33 in the same way, except that the steps shown in FIGS. 8, 9, and 10, i.e., the forming of the second developer image, the pre-transfer charging, and the transferring of the second developer image, are performed while the drum 5 is rotating at the second circumferential speed V2. The image can be printed on as many sheets as desired, by repeating only the three steps shown in FIGS. 8, 9, and 10, without carrying out the steps shown in FIGS. 3 to 7, i.e., the charging of the layer 9, the exposure of the layer 9 to light, the forming of the first developer image, the fixing of the first developer image, and the magnetizating of the first developer image. Since the image forming apparatus 1 performs only three steps to copy the master image, it can copy the master image 51 at high speed. Further, since the apparatus 1 has less power-consuming steps, it can save much power.

When a required number of copies have been made of the master image 51, that portion of the photosensitive belt 8 on which the image 51 is formed is taken up around the reel 11, whereby an unused portion of the belt 8 is wrapped around the drum 5, so that a new master image can be formed on this unused portion of the belt 8.

It will now be described how the apparatus operates in the copying mode to make a relatively small number of copies of the original image.

The copying-mode operation is different from the printing-mode operation in two respects. First, no master images are formed. Second, the drum 5 is rotated either at the first circumferential speed V1 or at a third circumferential speed V3 which is higher than the speed V1 and lower than the speed V2.

When the user operates the operation section (not shown), thereby setting the apparatus 1 in the copying mode, the optical system 4 starts reading the image from the original D. The drum 5 and the photosensitive belt 8 are rotated together at the first speed V1 or the third speed V3 in the direction of the arrow shown in FIG. 1, under the control of the control signal supplied from the control section 6. As the belt 8 is thus rotated, it is negatively and uniformly charged by the corona charger 20, as is shown in FIG. 3. The voltage applied to the corona charger 20 is adjusted in accordance with the circumferential speed of the drum 5, so that the photosensitive layer 9 of the belt 8 is charged to a predeterdegree even if the drum 5 is rotated at the third speed V3.

Figure 12:
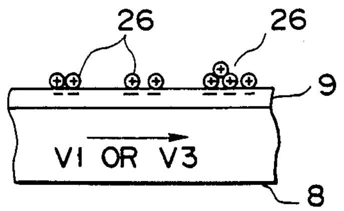
FIG. 12 through FIG. 15 are diagrams explaining how the apparatus form an image when operated in the copying mode.

The light reflected from the original D is applied to the photosensitive layer 9, thus forming an electrostatic latent image thereon, as is illustrated in FIG. 4. The electrostatic latent image, thus formed, is developed by the second developing device 22, as is shown in FIG. 12. More specifically, the particles of the second magnetic developing agent 26 are electrically charged by friction and attracted to the negatively charged portions of the photosensitive layer 9, thus forming a developer image on the layer 9.

Figure 13:
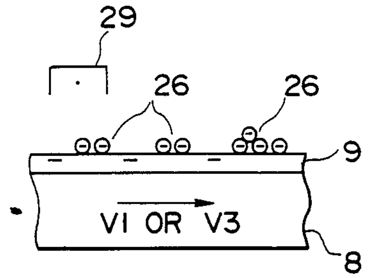
Figure 14:
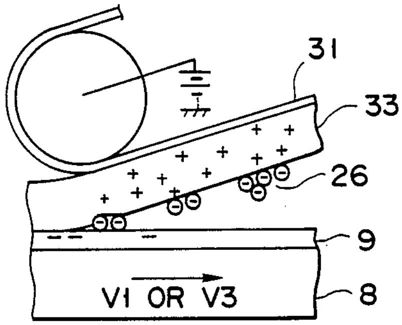

As the drum 5 is further rotated, the pre-transfer corona charger 29 charges the developer image, as is shown in FIG. 13. Then, the developer image is transferred from the photosensitive layer 9 onto a recording sheet 33. The developer image, now formed on the sheet 33, is fixed by the fixing device 36 of the heat-roller type in the same way as in the printing mode. The copied sheet 33 is transported onto the sheet-receiving tray 37.

Figure 15:
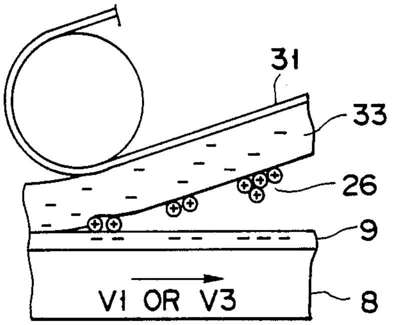

Without the pre-transfer corona discharging (FIG. 13), the developer image formed of the second developing agent 26 can be transferred from the layer 9 onto the sheet 33, either by applying a voltage to the belt 31, thus negatively charging the sheet 33 as is shown in FIG. 15, or by conducting corona discharge on the sheet 33.

After the developer image has been transferred from the layer 9 onto the sheet 33, the residual surface potential of the photosensitive layer 8 is discharged by the the discharging lamp 16. While the drum 5 is rotating one for the next time, the agent 26 is removed from the layer 9 by virtue of magnetic bushing, and is collected in the second developing device 22.

As can be understood from the above, the image forming apparatus 1, if set in the copying mode, makes one copy each time the drum 5 rotates twice. More precisely, it develops and transfer an electrostatic latent image while the drum is rotating for the first time, and clearing the photosensitive layer 9 while the drum 5 is rotating for the second time. In the copying mode, unused portion of the belt 8 is not wrapped around the drum 5 until the same portion is repeatedly used about 1000 times.

As has been described above, when the apparatus 1 consuming steps to make copies of an original image, once it has formed a master image, and can therefore save much power. In addition, once a master image has been formed, it can be copied fast by rotating the drum at the second speed V2. Further, the more copies are made of an original, the less the copying cost. Still further, since a magnetic latent image can be formed faster in forming the the second copy and et seq. than in forming the first copy, more time can be spent in developing this image, whereby the image is developed thoroughly to form a high-quality copy. Moreover, the image forming apparatus can reproduce a clear-cut image from an original even if the original has fine lines and large black-out patterns. This is because the AC magnetic field applied by the magnetic head has a frequency satisfying the inequality (1) and thus suitable for magnetizing the first developing agent.

As has been pointed out, the first developing agent is used as a master image. Its color will not influence the color of the copy reproduced from the master image. Hence, toner of any color can be used as the first developing agent 23, provided it can be readily magnetized.

As has been specified, the photosensitive belt 8 is made of zinc oxide. Nonetheless, the belt 8 can be made of any other photosensitive material. Further, the photosensitive belt 8 can be replaced by a belt made of deelectic material. Moreover, the optical system 40 can be replaced by a laser scanner for applying a laser beam to the photosensitive layer of the belt 8. Needless to say, the present invention can apply to a copier. Also, it can apply to a laser printer which can make a great number of copies of an original.

What is claimed is:

1. An image forming apparatus comprising:
- image-converting means for converting the image into an electrostatic latent image on an image holding member;
- first developing means for developing the electrostatic latent image on the image holding member, with a first developing agent, thereby to form a first developer image;
- first fixing means for fixing the first developer image on the image holding member, thereby to form a master image;
- magnetizing means for magnetizing the master image;
- second developing means for developing the magnetized master image with a second developing agent, thereby to form a second developer image;
- storing means for storing a number of sheets;
- image-transferring means for transferring one of the first and second developer images onto a sheet supplied from the storing means; and
- second fixing means for fixing the transferred image on the sheet.

2. The apparatus according to claim 1, further comprising drive means for moving said image holding member means at a first speed along said first developing means and said magnetizing means, and moving said image-converting means at a second speed higher than the first speed along said second developing means.

3. The apparatus according to claim 1, further comprising means for discharging the master image fixed on the image holding member.

4. The apparatus according to claim 1, wherein said image holding member includes a photosensitive layer on which said electrostatic latent image is formed, support means for supporting the photosensitive layer, and means for supplying the photosensitive layer onto the support means.

5. The apparatus according to claim 4, wherein said support means is a drum, and said first developing means, said second developing means, said first fixing means, said image-transferring means, said charging means, and said magnetizing means are located around said drum.

6. The apparatus according to claim 5, further comprising means for rotating said drum and said photolayer together.

7. The apparatus according to claim 6, wherein said means for rotating said drum rotates said drum at a first speed, thereby to move said photosensitive layer at the first speed along said first developing means and said magnetizing means, and for moving said drum at a second speed, thereby to move said photosensitive layer at the second speed along said second developing means.

8. The apparatus according to claim 7, wherein said first developing agent and said second developing agent are each one-component magnetic toner, and said first developing agent has greater magnetic flux density and greater coercive force than the second developing agent.

9. An image forming apparatus comprising:
- image-converting means for converting the image into an electrostatic latent image on an image holding member;
- first developing means for developing the electrolatent image on said image holding member, with a first developing agent which is a magnetic, developing agent, thereby to form a first developer image;
- first fixing means for fixing the first developer image on said image holding member, thereby to form a master image;
- means for generating an AC voltage having frequency f;
- magnetizing means for magnetizing the master image;
- second developing means for developing the magnetized master image with a second developing agent which is a magnetic, developing agent having an average particle size Dt thereby to form a second developer image;

image-transferring means for electrostatically transferring one of the first and second developer images onto a sheet;

second fixing means for fixing the transferred image on the sheet; and drive means for moving said image holding member at a first speed along said first developing means and said magnetizing means, and for moving the image-converting means at a second speed V along said second developing means, wherein the speed V, the particle size Dt, and the frequency f satisfy the following inequality:

$$\frac{V}{Dt \times 10^{-1}} \leqq f \leqq \frac{V}{Dt \times 10^{-5}}$$

10. The apparatus according to claim 9, further comprising means for discharging the master image fixed on the image holding member.

11. The apparatus according to claim 9, wherein said image holding member includes a photosensitive layer on which said electrostatic latent image is formed, support means for supporting the photosensitive layer, and means for supplying the photosensitive layer onto the support means.

12. The apparatus according to claim 11, wherein said support means is a drum, and said first developing means, said second developing means, said first fixing means, said image-transferring means, said charging means, and said magnetizing means are located around said drum.

13. The apparatus according to claim 12, further comprising means for rotating said drum and said photosensitive layer together.

14. The apparatus according to claim 13, wherein said first developing agent and said second developing agent are each one-component magnetic toner, and said first developing agent has greater magnetic flux density and greater coercive force than the second developing agent.

* * * * *